US010025533B2

(12) United States Patent
Bohn et al.

(10) Patent No.: US 10,025,533 B2
(45) Date of Patent: *Jul. 17, 2018

(54) LOGICAL BLOCK ADDRESSES USED FOR EXECUTING HOST COMMANDS

(71) Applicant: Seagate Technology LLC, Cupertino, CA (US)

(72) Inventors: Richard Esten Bohn, Shakopee, MN (US); Peng Li, Lauderdale, MN (US); David Tetzlaff, Minnetonka, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/401,570

(22) Filed: Jan. 9, 2017

(65) Prior Publication Data

US 2017/0115934 A1 Apr. 27, 2017

Related U.S. Application Data

(63) Continuation of application No. 14/522,160, filed on Oct. 23, 2014, now Pat. No. 9,542,122.

(51) Int. Cl.
G06F 3/06 (2006.01)
G06F 13/42 (2006.01)

(52) U.S. Cl.
CPC .......... *G06F 3/0659* (2013.01); *G06F 3/0604* (2013.01); *G06F 3/064* (2013.01); *G06F 3/0685* (2013.01); *G06F 13/4282* (2013.01)

(58) Field of Classification Search
CPC ...... G06F 3/0659; G06F 3/0685; G06F 3/064; G06F 3/0604; G06F 13/4282; G06F 3/0605
USPC .......................................... 711/114, 112, 202
See application file for complete search history.

(56) References Cited

U.S. PATENT DOCUMENTS

| 8,019,925 | B1* | 9/2011 | Vogan | G06F 12/04 711/202 |
| 8,289,984 | B2* | 10/2012 | Sebastian | G06F 3/0613 370/351 |
| 8,713,283 | B2 | 4/2014 | Sinclair | |
| 8,832,371 | B2* | 9/2014 | Uehara | G06F 3/0616 711/103 |
| 8,935,465 | B1* | 1/2015 | Shaharabany | G06F 12/0246 711/103 |
| 2006/0236064 | A1 | 10/2006 | Niles | |
| 2007/0033373 | A1 | 2/2007 | Sinclair | |
| 2007/0043897 | A1 | 2/2007 | Blacquiere et al. | |
| 2008/0016275 | A1* | 1/2008 | Sebastian | G06F 3/0613 711/114 |
| 2012/0191900 | A1* | 7/2012 | Kunimatsu | G06F 12/0223 711/103 |
| 2013/0067269 | A1 | 3/2013 | Gold et al. | |
| 2013/0132662 | A1 | 5/2013 | Muroyama et al. | |

(Continued)

*Primary Examiner* — Pierre Miche Bataille
(74) *Attorney, Agent, or Firm* — Hollingsworth Davis, LLC

(57) ABSTRACT

A logical block address space of a storage compute device is reserved for use in executing commands from a host. First data is received at a first portion of the logical block address space, the first data causing a computation to be performed by the storage compute device. Second data is sent to the host via a second portion of the logical block address space, the second data describing a result of the computation.

20 Claims, 5 Drawing Sheets

(56) References Cited

U.S. PATENT DOCUMENTS

2014/0344507 A1* 11/2014 Piggin ................. G06F 12/0246
    711/103
2015/0067281 A1    3/2015 Jones et al.
2015/0081991 A1    3/2015 Hidaka

* cited by examiner

LOGICAL BLOCK ADDRESSES USED FOR EXECUTING HOST COMMANDS

RELATED PATENT DOCUMENTS

This application is a continuation of U.S. Ser. No. 14/522,160, filed Oct. 23, 2014, which is hereby incorporated herein by reference in its entirety.

SUMMARY

The present disclosure is related to logical block address used for executing host commands. In one embodiment, a method involves reserving a logical block address space of a storage compute device for use in executing commands from a host. First data is received at a first portion of the logical block address space, the first data causing a computation to be performed by the storage compute device. Second data is sent to the host via a second portion of the logical block address space, the second data describing a result of the computation.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures. The drawings are not necessarily to scale.

DETAILED DESCRIPTION

Figure 1:
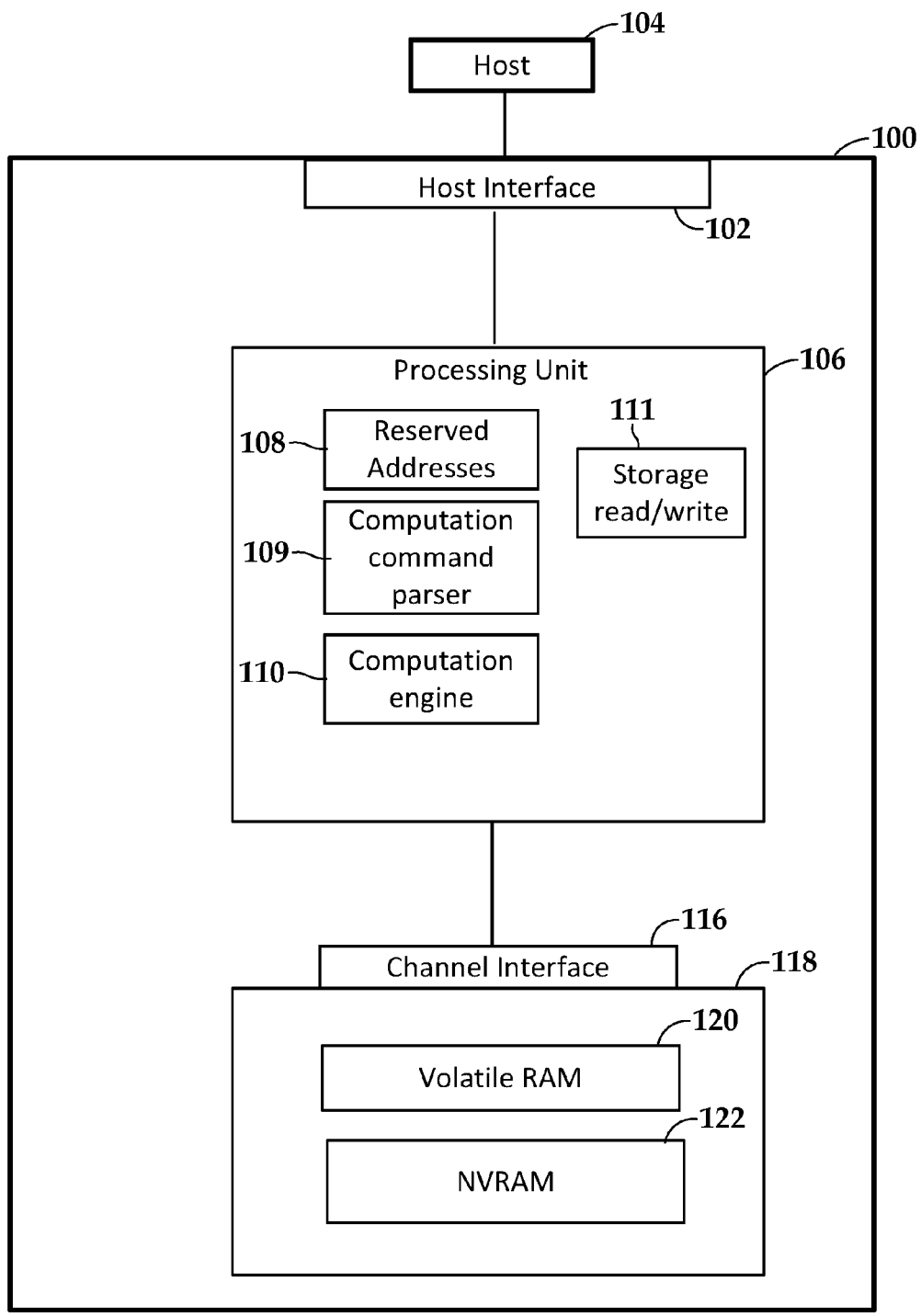
FIG. 1 is a block diagram of a storage compute device according to an example embodiment.

Some computational tasks are well-suited to be performed using massively distributed computing resources. For example, data centers that provide web services, email, data storage, Internet search, etc., often distribute tasks among hundreds or thousands of computing nodes. The nodes are interchangeable and tasks may be performed in parallel by multiple computing nodes. This parallelism increases processing and communication speed, as well as increasing reliability through redundancy. Generally, the nodes are rack mounted computers that are designed to be compact and power efficient, but otherwise operate similarly to desktop computer or server.

For certain types of tasks, it may be desirable to rearrange how data is processed within the individual nodes. For example, applications such as neuromorphic computing, scientific simulations, etc., may utilize large matrices that are processed in parallel by multiple computing nodes. In a traditional computing setup, matrix data may be stored in random access memory and/or non-volatile memory, where it is retrieved, operated on by relatively fast central processor unit (CPU) cores, and the results sent back to volatile and/or non-volatile memory. It has been shown that the bus lines and I/O protocols between the CPU cores and the memory are a bottleneck for some types of computations.

This disclosure generally relates to use of a data storage device that performs internal computations on data on behalf of a host, and is referred to herein as a storage compute device. While a data storage device, such as a hard drive, solid-state drive (SSD), hybrid drive, etc., generally include data processing capabilities, such processing is related to the storage and retrieval of user data. So while the data storage device may perform some computations on the data, such as compression, error correction, etc., these computations are invisible to the host. Similarly, other computations, such as logical-to-physical address mapping, involve tracking host requests, but are intended to hide these tracking operations from the host and as such are not computation directives from the host.

While a storage compute device as described herein may be able to perform as a conventional storage device, e.g., handling host data storage and retrieval requests, such devices may include additional computational capability that can be used for certain applications. For example, scientific and engineering simulations may involve solving matrix equations on very large matrices. Even though the matrices may be sparse, and therefore amenable to a more concise/compressed format for storage, the matrices may still be so large as to prevent computing a solution using the random access memory (RAM) of a single computing node.

One solution to solving these large matrix problems is to distribute the solution among a number of nodes coupled by a network. Each node will solve part of the problem, and various internode messages are passed to coordinate operations and shared data between the nodes. While this can alleviate the need for large amounts of RAM on each node, it has been found that in some cases this does not effectively use processing resources. For example, the central processing units (CPUs) may spend significant amounts of time waiting for network input/output (I/O) and be underutilized as a result.

It generally accepted that in some cases compute performance can be improved by keeping the data "close to" the processors that operate on the data. This closeness refers both to physical proximity and reduction in the number of different communications channels and protocol layers that lie between the data in memory and the processor. While CPU and RAM might qualify as close to one another (particularly when using hierarchical memory caches), the size of system RAM may be limited for some problems. In such a case, the system bottlenecks occur in slower channels (e.g., disk drives, network interfaces) moving data in and out of RAM as needed.

For problems and applications that work on very large sets of data, a local non-volatile memory device, a storage compute device, may be used to store the data sets, as well as perform some or all of the calculations. While the speed of currently available non-volatile RAM (NVRAM) is appreciably slower than currently available dynamic RAM (DRAM), for problems with large data sets, an increase in performance may be seen by performing the computations on the storage device itself. While the processor and memory resident on typical storage devices may be slower than CPU and RAM of typical computers, the amount of NVRAM available can be orders of magnitude greater than RAM for similar cost. Further, the storage device can move large amounts of between its non-volatile memory and its local processor more quickly that it could move the same data to a CPU. Internal data processing does not have to deal with contention, translation, protocols, etc., that is involved in moving data between the host interface of the storage device and the CPU cores.

In embodiments described below, a storage compute device includes a compute section that performs computations using host-provided computation objects. For purposes of this discussion, computation objects may at least include objects that facilitate performing computations on data objects. Computation objects may include stored instructions, routines, formulas, definitions, commands, etc., that facilitate performing repeatable operations. A computation object may include data objects, such as scalars/constants that are utilized in all of the relevant computations and accessible by the compute section (e.g., using local or shared volatile memory). A computation object may be defined within a command such that it is not persistently stored after execution. Data objects are used as inputs and outputs of the computations, and may also include temporary objects used as part of the computations, e.g., intermediate computation objects. While the examples below may refer to certain types of data objects, e.g., matrices, it will be understood that the embodiments described herein may be used to perform computations on other data sets, such as media files/streams, neural networks, log data, etc.

Because a storage compute device may also perform legacy storage operations, it may utilize legacy interfaces, such as SCSI, SATA, SaS, NVMe, etc. The command sets of these protocols are mostly directed to block level access (e.g., read, write) of stored data. It can be expensive to develop additional, custom, protocols, storage compute operations may also use existing interfaces and command sets. To simplify the adoption of new technologies, it is desirable to not change the interface to the device at driver level or below (e.g., BIOS, kernel, operating system). This allows an application developer to leverage existing storage device drivers to perform computations. The computations may be performed using legacy commands (e.g., read, write, verify) yet results in the storage compute device performing operations on data sets instead of just storing and retrieving data.

Standard storage device protocols such as SATA, SAS, and NVMe contain commands for reads and writes of blocks of data. To perform operations for storage compute higher-level configuration and commands are required, such as commands that define data objects and compute objects, and cause operations to be performed using the compute objects. Embodiment described herein facilitate communicating configuration information and commands to storage compute devices without changing the interface to the devices at the driver level or below.

In the embodiments described herein, specific locations in the block address space of a storage compute device are mapped to specific configuration, command, and/or data functions. Writes to these block addresses are interpreted by the storage compute device as messages used to set configurations or to execute commands. Reads from these locations provide device status and/or results from the commands. This solution enables the implementation of new functions and commands, especially higher-level functionality associated with object storage and storage-compute using existing, unmodified storage protocols.

In FIG. 1, a block diagram shows a storage compute device 100 according to an example embodiment. The storage compute device 100 may provide capabilities usually associated with data storage devices, e.g., storing and retrieving blocks of data, and may include additional computation abilities as noted above. Generally, the storage compute device 100 includes a host interface 102 configured to communicate with a host 104. The host interface 102 may use electrical specifications and protocols associated with a legacy hard drive host interface, such as SATA, SaS, SCSI, PCI, Fibre Channel, etc.

The storage compute device 100 includes a processing unit 106. The processing unit 106 includes hardware such as general-purpose and/or special-purpose logic circuitry configured to perform functions of the storage compute device 100, including functions indicated in functional blocks 108-112. Functional block 111 provides legacy storage functionality, such as read, write, erase, and verify operations affecting stored data. Blocks 108-110 represent specialized functionalities that allow the storage compute device 100 to provide internal computations on behalf of the host 104.

Block 109 represents a command parser that manages object-specific and computation-specific communications between the host 104 and storage compute device 100. These commands are communicated via a space of reserved addresses 108, e.g., logical addresses used via the host interface. For example, the host 104 may write to particular ones of the reserved addresses 108 to communicate data to the command parser 109 that define objects (matrices, vectors, scalars, sparse distributed representations, files, streams, etc.) and initiate operations (e.g., scalar/matrix mathematical and logical operations, neural processing) to be performed on the objects by a computation engine 110. Similarly, the host 104 may read from particular ones of the reserved addresses 108 to determine computation status, read back results of the operations, etc. The storage compute device 100 may implement protection mechanisms for the controlled space so the host system does not expect the reserved address space 108 to be usable for data storage. For example, the expected behavior for a format operation may be defined to prevent the reserved address space 108 from being incorporated into a drive partition.

The computation engine 110 performs the operations on the objects, and may be specially configured for a particular class of operation. For example, if the storage compute device 100 is configured to perform a set of matrix operations, then the computation engine 110 may be optimized for that set of operations. The optimization may include knowledge of how best to store and retrieve objects for the particular storage architecture used by the storage compute device 100. The computation engine 110 may use stored computation objects that may be compiled and/or optimized by the computation engine 110.

The functional blocks 108-110 may access persistent storage, by way of a channel interface 116 that provides access to a memory unit 118. There may be multiple channels, and in such a case there may be a dedicated channel interface 116 and computation engine 110 for each channel. The memory 118 may include both volatile memory 120 (e.g., DRAM and SRAM) and non-volatile memory (e.g., flash memory, magnetic media) 122. The volatile memory 120 may be used as a cache for read/write operations performed by read/write block 111, such that a caching algorithm ensures data temporarily stored in volatile memory 120 eventually gets stored in the non-volatile memory 122. The computation blocks 108-110, and 112 may also have the ability to allocate and use volatile memory for calculations. Intermediate results of calculations may remain in volatile memory 120 until complete and/or be stored in non-volatile memory 122.

Figure 2:
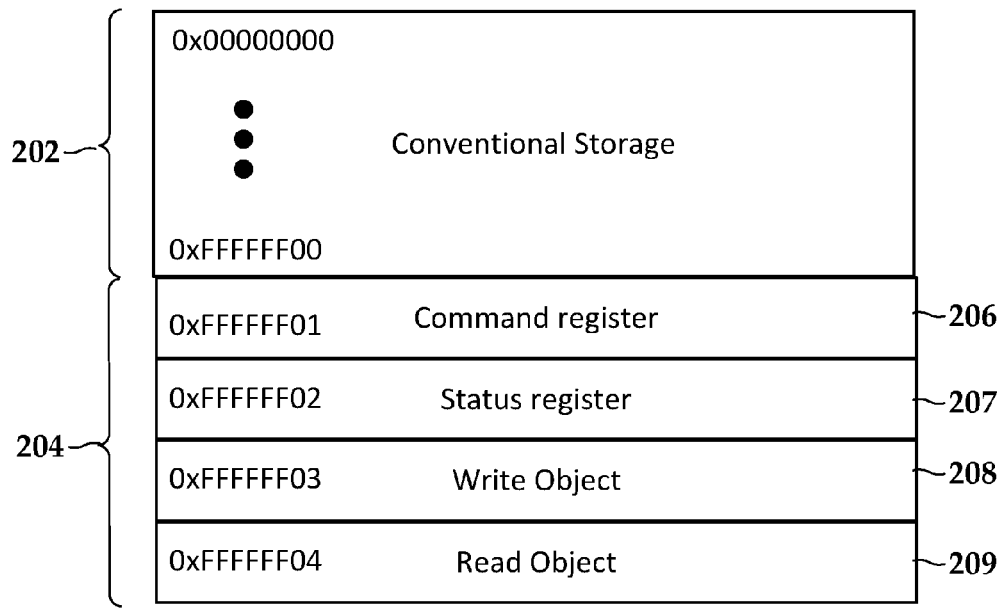
FIGS. 2-3 are block diagrams illustrating logical address mapping according to example embodiments.

In reference now to FIG. 2, a block diagram illustrates a reserved address space of a storage compute device according to an example embodiment. The addresses are indicated using hexadecimal numerals, and may represent logical addresses, sector identifiers, etc. Address range 202 represents addresses used for conventional (e.g., legacy) storage operations. Generally, these legacy operations are controlled by the host, and the storage device may have limited knowledge about the data stored at a particular address. For example, the host may store a file starting at logical address A and ending at logical address B, and may store metadata that describes this file at a different address C, the metadata including the address range, file name, file type, etc. However, the only evidence of this seen by the storage compute device is a command to write data in the range of logical address A and logical address B, as well as other apparently unrelated logical address C, e.g., to store the metadata. The storage compute device may need to determine a physical address that corresponds to the logical address, e.g., via a direct mapping (e.g., applying an offset to the logical address) or a more complicated mapping (e.g., lookup table). Otherwise, the storage compute device may not treat the data at address A any different than that at address A-1, although from the host's perspective this data may be, e.g., part of different files, partitions, etc.

Reserved address range 204 is an address space reserved for executing commands from a host. Those commands may be executed using legacy storage commands (e.g., read, write) although operations resulting from the legacy commands are not legacy operations. The addresses in the reserved address range 204 are used as an entry point to access compute functionality of the storage compute device. The logical addresses in the range 204 are not mapped to a physical address space, at least not in the same way that the conventional addresses 202 are mapped. An address in the range 204 is a fixed, well-known, and/or discoverable address that is used as a starting address used to write arbitrarily-sized data objects and/or command messages. This allows flexibility in processing the data and commands by the storage compute device, yet allows reusing existing driver codebase that exists for writing to the conventional address range 202. It should be noted that the conventional address range 202 may also include reserved addresses, e.g., for determining device information, applying firmware updates, etc. However, in a conventional device, those addresses do not facilitate performing computations that provide a result to the host as is shown for reserved address range 204, and for other embodiments shown herein.

In the example of FIG. 2, the reserved address range 204 may include at least four logical addresses 206-209 to accomplish object definition, configuration, and command execution. Address 206 is a register used to write a command. The command may include instruction codes, references/keys that identify data objects, computation objects, and other data. Status address 207 is a register used to return status to the commands. The data received at address 207 may be synchronized with the writing of commands at address 206. For example, a calling process on the host may perform a blocking read (e.g., via a separate thread of execution) at address 207 together with writing the command to address 206, such that the calling process can obtain acknowledgment and status of commands after they have been sent. In some cases, the commands received via address 206 may set a configuration of the device function (e.g., activate certain features of the computation engines), and may be processed similarly to computations. In other cases, a separate address (not shown) may be reserved for configurations.

In one example, a calling process may set up command and status queues that are used to queue outgoing commands to address 206 and queue status messages from address 207. The commands and status messages may have unique identifiers, so that responses can be out of order with the commands. This allows the host to cue a number of commands which may have different completion times, and resolve status even if the status messages are out of order. Generally, both the commands and status/response messages (or objects) may be relatively small, e.g., 512 bytes or other sector size used by the storage device. This is in contrast to the data objects that are managed by addresses 208 and 209.

Addresses 208 and 209 are used to respectively write and read streams of data that describes objects. The addresses 208, 209 may be used in conjunction with commands and status communicated via addresses 206 and 207. For example, a "store" or "define" command may be sent via address 206, the command providing metadata related to the object, e.g., type, size, etc. This metadata may be distinguished from data stored in the object, although the partition between data and metadata may change based on context. For example, a file descriptor may include data that describes a bitmap image by defining, e.g., and address where the file is stored, filename, etc. However, headers of the bitmap file may also include metadata that describes size and extent of the image, color depth, etc. This header data may then be followed by an array of numbers that describe particular pixel values. For purposes of this discussion, the metadata is any data that may be stored separately from the data object that describes the object, whereas the data is the part of interest to an end user.

The system may provide a unique identifier for the object via the status address 207, and this identifier is used when writing the object to address 207. In the case where a command is issued via address 206 that creates a new object, a status message may be read via address 207 that provides an identifier, and this identifier is used to read the object via address 209. For example, the first n-bytes of the data read from address 209 may include the identifier, such that the host is able to determine the identity of the object, and other data, e.g., object type, size, etc.

The addresses 208 and 209 may be used for writing data of the data objects themselves (e.g., individual entries of an array, bytes of a media file), and/or for writing metadata that describes an object that was previously stored via the conventional address space 202. For example, the storage compute device may be used as storage for a server, such as a web server, file server, database, etc. A host may store data to files using a legacy operation such as writing a file via a filesystem. At a later time, the host may desire to analyze the stored files. The host may define data objects by writing metadata to address 208, the metadata indicating logical addresses of the file, data type, etc. Thereafter, the storage compute device may utilize the data object in the same way as if the object were communicated in its entirety (including data and metadata) via address 208.

It will be understood that the use of addresses 208, 209 may be optional. For example, the commands and status messages sent via addresses 206, 207 may make reference to data stored at logical block addresses of conventional address space 202. Or, even if the reserved addresses 208, 209 are used, the data objects (and compute objects) may be defined and/or made accessible via conventional address space 202 as well. In other examples, the addresses 206, 207 may be used for commands, compute objects, and data objects, e.g., utilizing a stateful protocol. For purposes of the following discussion, reserved object read/write addresses are disclosed, however one of ordinary skill in the art will understand that this can be extended/adapted to use conventional address space for data objects.

A storage compute device may have a plurality of reserved address range sets similar to range 204. For example, each calling process may have dedicated pairs of command and status registers 206, 207 and dedicated pairs of object access addresses 208, 209. This can take advantage of parallelism available on the host (e.g., multiple processes running on multiple processor cores) and parallelism of the storage compute device (e.g., multiple compute engines). An alternate way of achieving this parallelism is shown in the block diagram of FIG. 3, which shows a reserved address space of a storage compute device according to another example embodiment.

Figure 3:
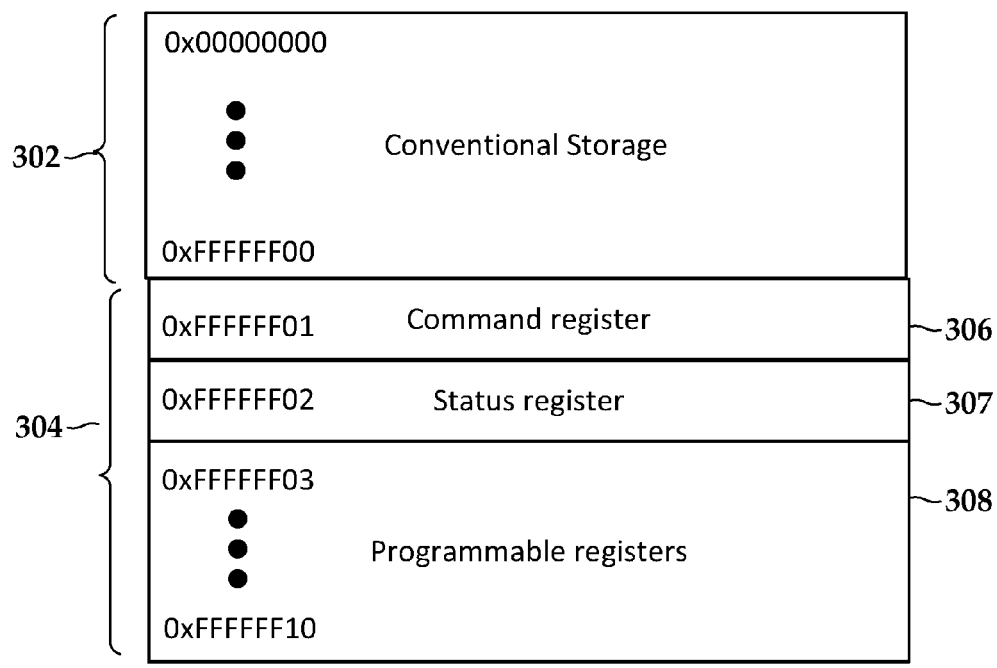

In FIG. 3, conventional address range 302 may be similar to range 202 shown in FIG. 2. A reserved address range 304 includes command and status addresses 306, 307 similar to addresses 206, 207 in FIG. 2. The reserved address range 304 also includes a sub-range 308 that can be dynamically assigned, e.g., by the storage compute device. For example, if a command is sent to address 306 for creating an object, the status read back from address 307 will also include an address of sub-range 308 that can be used to write the object's data/metadata (or read the object's data, in cases where the storage compute device creates or modifies an object in response to a calculation). In this way, multiple processes can share the command and status addresses 306, 307, but have dedicated addresses in sub-range 308 that can be dedicated to transferring object data, which is more time consuming than the command and status messages. In another configuration, large objects can be broken into parts and written to different addresses in the sub-range 308, which may allow for speeding up the transfer of large objects if there is available bandwidth at the host interface. Further, as indicated above, functions of this sub-range 308 can alternatively be implemented using conventional storage addresses 302.

Figure 4:
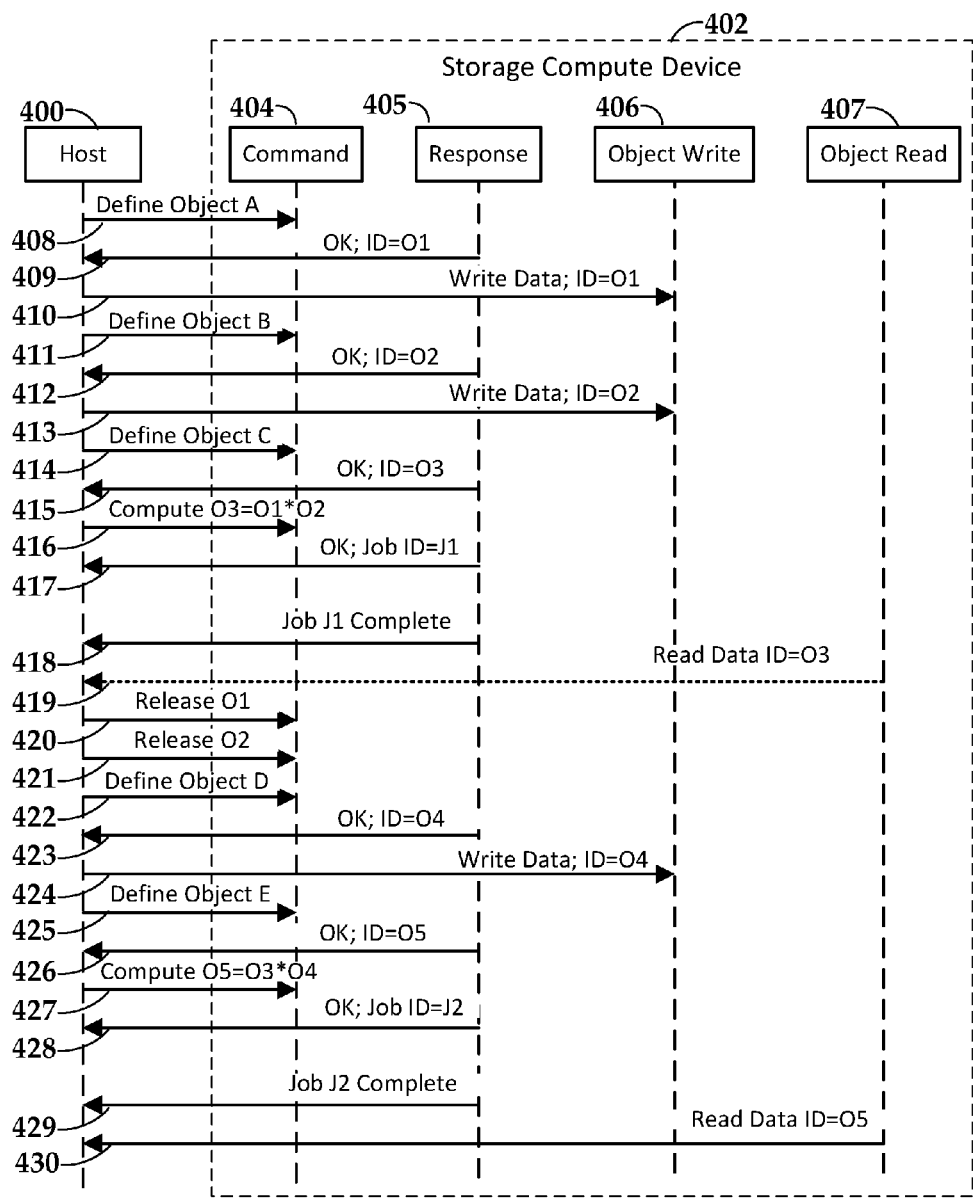
FIG. 4 is a sequence diagram showing computations according to an example embodiment.

In FIG. 4, a sequence diagram illustrates how a host 400 and storage compute device 402 may interact according to an example embodiment. The storage compute device 402 includes reserved addresses 404-407 that have functionalities similar to those described in FIGS. 2 and 3. The reserved addresses 404-407 may be fixed/predetermined, or may be dynamically allocated from within a fixed/predetermined range, e.g., on a per-process basis. The host will be performing a mathematical function in the form of E=(A*B) *D, where the variables may be matrices, scalars, or any other object that may be multiplied. In this example, the mathematical function is performed using an intermediate result C=A*B.

Command 408 tells the storage compute device 402 to define an object, and the command 408 may include metadata such as object type (e.g., vector, matrix, data structure), data types (e.g., floating point, integer), size, host-specific identifier, etc. This command 408 (as well as other commands and responses) can be achieved at least in part by using a legacy command set for reading and writing data to the storage compute device 402 Response message 409 indicates a unique identifier (unique at least locally to the storage compute device) and indicates that the data can be written to address 405. In some embodiments, the response message 409 may also indicate an address to where the object data should be written. The object data is written by the host 400 via data transfer 410 and an additional response (not shown) may be indicated to the host 400 that the object data was successfully written, the data complied with what was defined in the metadata, etc. If the object data was already written via the conventional address space, then operation 410 would not be needed. Object B is similarly written via commands 411-413.

Command 414 defines object C, and an identifier is provided via response 415, however no data is written by the host because object C is a resultant object. The host 400 may expressly communicate that C is a resultant via the definition command 414, so that the storage compute device 402 can prepare storage space and initialize it if needed. Thereafter, a computation command 416 tells the storage compute device to perform the operation A*B and put the result in the C object. The computation command 416 may be a single operation as shown here that is passed in for each invocation, The computation command 416 may instead or in addition reference and/or define a compute object that is stored on the storage compute device 402, such that it can be referenced and reused similar to the data objects.

The compute object may perform a large number of predefined mathematical and logical operations. For example, the command 416 may reference a previously stored function such as ExtractFeatures(Object) which performs an image analysis of a stored file. The file can be defined by an Object parameter that is included in the command 416 when the function is invoked. The computation object that defines the ExtractFeatures function may be stored by the host as object code executable by the storage compute device 402.

Response 417 is received in response to the command 416. The response 417 may provide at least immediate indication that the command 416 is acceptable (e.g., A and B exist and can be multiplied) and provides a job identifier. For short computation, the response 417 may be sent after the command 416 is processed and indicate completion. In this case, it is assumed that the operation may take a long time, e.g., the objects are large and/or the computation is resource intensive, and so a separate response 418 is sent afterwards to indicate job completion.

If C was not an intermediate object and/or was of interest to the host 400, it could optionally be read back from address 407 as indicated by optional data transfer 419. Commands 420 and 421 can also be used, as shown here, to release the objects A and B if they are no longer needed. This allows the storage compute device 402 to reuse the storage space for those objects. Objects D and E are defined via operations 422-426 (object E is a resultant) and computation is performed via operations 427-429. Resultant object E is read back to the host via data transfer 430.

It will be understood that the example sequences shown in FIG. 4 may be varied in a number of ways. For example, while the job begun via command 418 is proceeding, the host 400 may be able to perform other operations, such as defining objects shown by operations 422-426. Similarly, the writing and reading of objects (e.g., operations 410, 413, etc.) may be interleaved with other commands so that the computation engines of the storage compute device 402 may perform internal computations even if the host interface is highly utilized in transferring large data sets to or from the host 400. In other configurations, the computations 415, 427 may be combined in a single compute object stored on the storage compute device 402 and invoked together or in stages. Other aspects of the computations 415, 417, such as the permanency of intermediate objects, may be defined via the computation object. For example, the release of objects shown in operations 420, 421 may be initiated internally by the storage compute device 402 based on instructions in a compute object.

Figure 5:
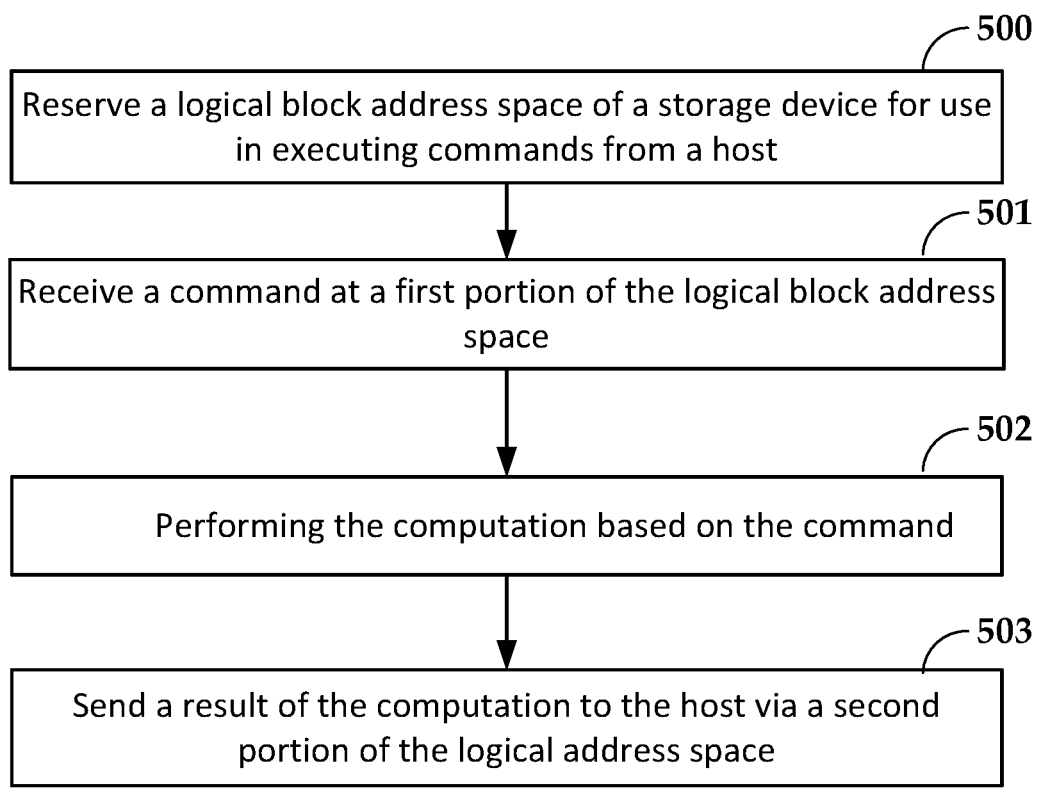
FIG. 5 is a flowchart illustrating a method according to an example embodiment.

In reference now to FIG. 5, a flowchart illustrates a method according to an example embodiment. The method involves reserving 500 a logical block address space of a storage device for use in executing commands from a host. The logical block address space is not mapped to a physical address space. A command is received 501 at a first portion of the logical block address space. The command causing a computation 502 to be performed by the storage device. A result of the computation is sent 503 to the host via a second portion of the logical block address space.

Figure 6:
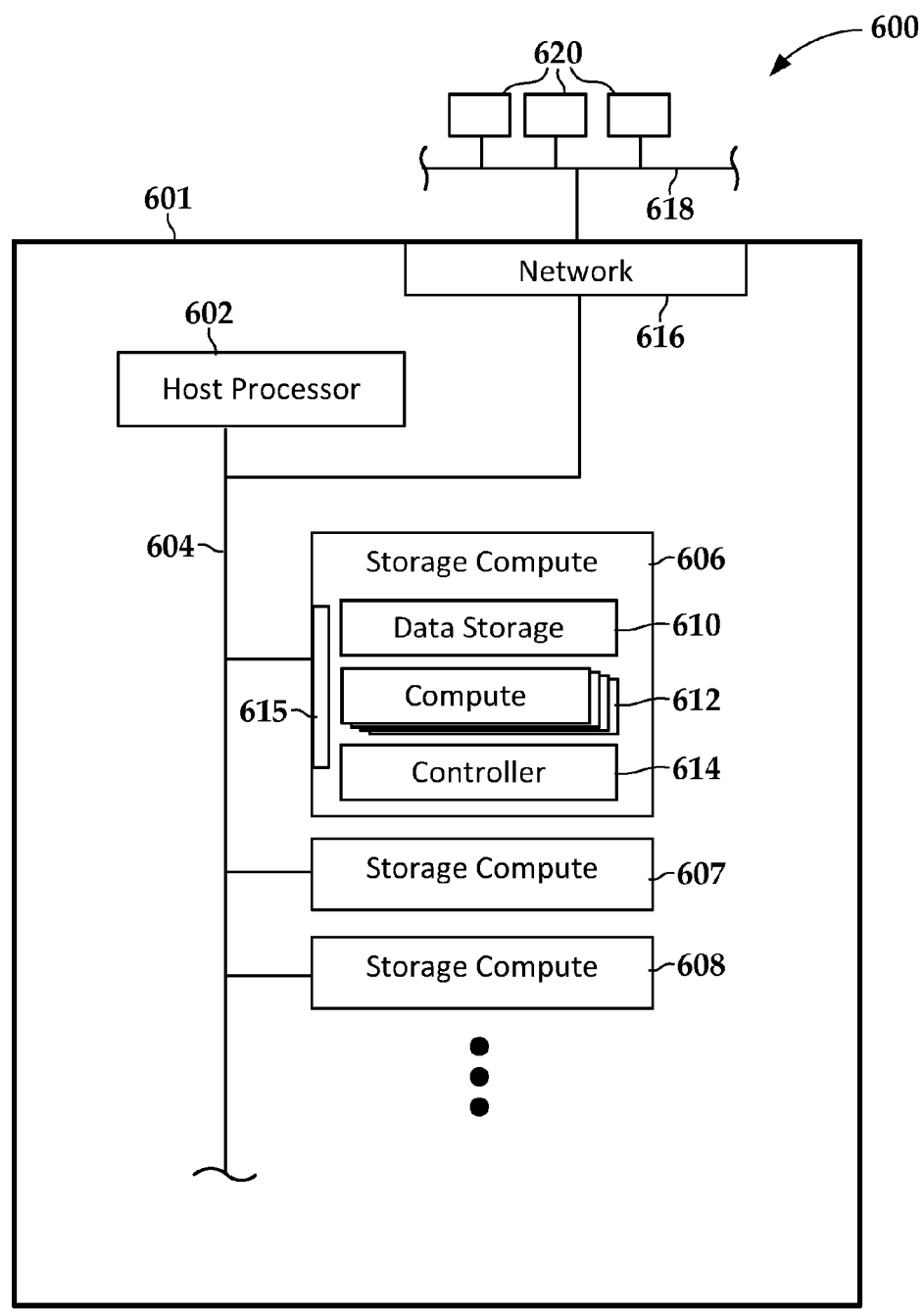
FIG. 6 is a block diagram of a system according to an example embodiment.

In reference now to FIG. 6, a block diagram illustrates a system 600 according to an example embodiment. The system includes a host device 601 with a host processor 602 that is coupled to a data bus 604. The data bus 604 may include any combination of input/output transmission channels, such as southbridge, PCI, USB, SATA, SaS, etc. On or more storage compute devices 606-608 are coupled to the data bus 604. As shown for storage compute device 606, each of the devices 606-608 includes a data storage section 610 that facilitates persistently storing data objects on behalf of the host processor. The data objects are internally managed by the storage compute device 606. The storage compute devices 606-608 include two or more compute sections 612 that perform computations on the data objects, and a controller 614.

The controller 614 reserves a logical block address space 615 of the storage device 606 for use in executing commands from the host processor 602. The logical block address space is not mapped to a physical address space of the data storage section 610. The controller 614 receives first data at a first portion of the logical block address space 615. The first data causes a computation to be performed by at least one of the compute sections 612 of the storage compute device 606. After the computation is complete, the controller 614 sends second data to the host processor 602 via a second portion of the logical block address space 615. The second data describes a result of the computation.

The computation performed as described above may be part of a larger, distributed computation task being performed cooperatively by all the storage compute devices 606-608. For example, a very large matrix problem (e.g., involving a matrix with millions of rows and columns) may be broken into smaller portions which are distributed to the storage compute devices 606-608. The host processor 602 manages the distributed tasks, and coordinates updating individual storage compute devices 606-608 for iterative operations. In some embodiments, the host device 601 may be coupled to a network 618 via a network interface 616. Other network nodes (e.g., similarly configured host devices 620) of the network 618 may also be able to process the distributed computation tasks in parallel with the host device 601.

The use of storage bus command sets and protocols (e.g., SATA, SCSI) to perform the indicated computations and access to data objects may be extended over the network. For example, an existing network file system protocol may be extended to In other examples, a custom protocol (e.g., one that emulates a local storage device) may be defined that allows extending the storage compute device computations across network nodes. In either case, existing code for conventional storage operations can be reused to some extent to perform the computations. support computations in a manner similar to the use of local filesystem protocols. For example, the host processor 602 can execute commands, set configurations, and access data objects to storage compute devices located on other host devices 620 without being aware the storage compute devices are remotely located.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts or other diagrams presented herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A storage compute device, comprising:
 a host interface that receives storage commands from a host via a legacy data storage command set, the host interface comprising a reserved logical address range used for executing commands from the host; and
 a processing unit coupled to the host interface, the processing unit configured to:
  receive, via the legacy data storage command set, first data from the host at a first logical block address that is part of the reserved logical address range;
  interpret the first data as a message that causes a computation to be performed at the storage compute device;
  perform the computation according to the message; and
  store a result of the computation at a second logical block address, the host retrieving the response to the computation at the second logic block address using the legacy data storage command set.

2. The storage compute device of claim 1, wherein the processing unit is further configured to receive second data from the host at a third logical block address that is part of the reserved logical address space, the second data describing a data object being operated on by the computation.

3. The storage compute device of claim 2, wherein the data object comprises a matrix.

4. The storage compute device of claim 2, wherein the data object is stored via the third logical block address.

5. The storage compute device of claim 2, wherein metadata of the data object is received at the third logical block address, the data object being stored at a fourth logical block address that is described in the metadata, the fourth logical block address being used for legacy storage operations.

6. The storage compute device of claim 1, wherein the legacy data storage command set is associated with one of SATA, SaS, SCSI, and PCI host interface protocols.

7. The storage compute device of claim 1, wherein the second logical block address is part of the reserved logical address space.

8. The storage compute device of claim 1, wherein interpreting the first data comprises parsing the first data to determine an operation to be performed as part of the computation.

9. A method comprising:
 receiving first data from a host at a first logical block address of a storage compute device using a legacy data storage command set, the first logical block address being part of a reserved logical address space used for executing commands from the host;

interpreting the first data as a message that causes a computation to be performed at the storage compute device;

performing the computation in according to the message; and storing a result of the computation at a second logical block address, the host retrieving the response to the computation at the second logic block address using the legacy data storage command set.

10. The method of claim 9, further comprising receiving second data from the host at a third logical block address that is part of the reserved logical address space, the second data describing a data object being operated on by the computation.

11. The method of claim 10, wherein the data object comprises a matrix.

12. The method of claim 10, wherein the data object is stored via the third logical block address.

13. The method of claim 10, wherein metadata of the data object is received at the third logical block address, the data object being stored at a fourth logical block address that is described in the metadata.

14. The method of claim 13, wherein the fourth logical block address is used for legacy storage operations.

15. The method of claim 9, wherein the legacy data storage command set is associated with one of SATA, SaS, SCSI, and PCI host interface protocols.

16. The method of claim 9, wherein the second logical block address is part of the reserved logical address space.

17. The method of claim 9, wherein interpreting the first data comprises parsing the first data to determine an operation to be performed as part of the computation.

18. A method comprising:

receiving first data from a host at a first logical block address of a storage compute device using a legacy data storage command set, the first logical block address being part of a reserved logical address space used for executing commands from the host;

parsing the first data to determine a command to perform a computation to be performed at the storage compute device;

receiving second data from the host at a second logical block address using the legacy data storage command set, the second logical block address being part of the reserved logical address space, the second data describing a data object being operated on by the computation;

performing the computation on the data object according to the command; and storing a result of the computation at a third logical block address, the host retrieving the response to the computation at the third logic block address using the legacy data storage command set.

19. The method of claim 18, further comprising storing metadata describing the result of the computation at a fourth logical address that is part of the reserved logical address space, the metadata including the third logical address, the third logical address being used for legacy storage operations.

20. The method of claim 18, wherein the legacy data storage command set is associated with one of SATA, SaS, SCSI, and PCI host interface protocols.

* * * * *